Nov. 7, 1967   E. BERGER   3,351,753
LUMINAIRE REFRACTOR
Filed Aug. 27, 1965
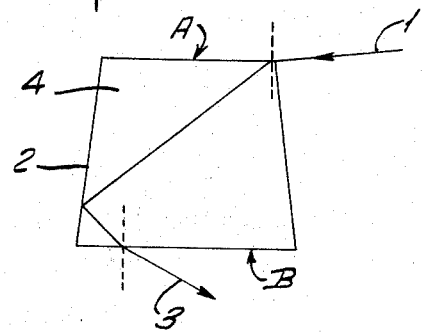
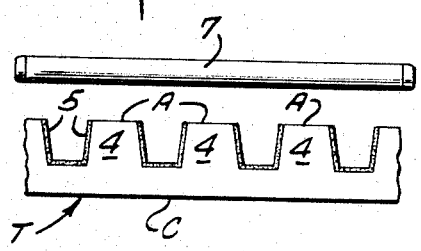
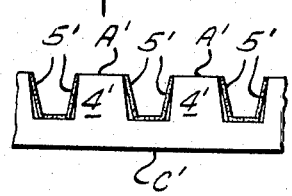
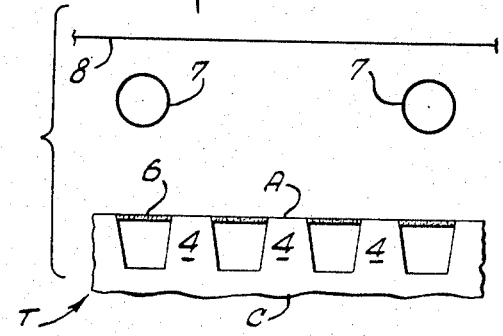
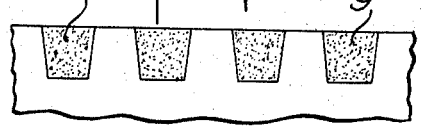
INVENTOR
EMANUEL BERGER
BY
Nolte & Nolte
ATTORNEYS United States Patent Office 3,351,753
Patented Nov. 7, 1967

3,351,753
LUMINAIRE REFRACTOR
Emanuel Berger, Newark, Ohio, assignor to Holophane Company, Inc., New York, N.Y., a corporation of Delaware
Filed Aug. 27, 1965, Ser. No. 483,066
4 Claims. (Cl. 240—106)

ABSTRACT OF THE DISCLOSURE

The present disclosure relates to refractors for luminaires, in which truncated prisms are provided on the light incident surface of the refractor and in which a reflective material covers the entire light incident surface of the refractor with the exception of the top surfaces of the truncated prisms so that light from the light source of the luminaire can only pass through the top surfaces of the prisms while any other light impinging from the light source onto the light incident surface of the refractor is reflected back into the luminaire.

---

This invention relates to refractors for luminaires employing linear and non-linear light sources.

It is an object of this invention to provide a novel lens having prism formations on the light incident side so constructed that, incident rays which otherwise might be emitted at glare or high angles, will have their vertical angles decreased upon emission from the light emergent surface of the lens. This is accomplished by providing truncated prisms on the light incident side of the lens and by covering or coating the surfaces of the prisms with a reflecting material so that light will enter the prisms only at the top surfaces thereof. These truncated prisms may have various shapes such as conical, square, hexagonal, etc. The embodiment used in this application for purposes of illustration, however, is conical. The coating or covering material referred to allows, little or no light through the cone or prism surfaces; except through the top, truncated section.

It is a further object of this invention to provide such a lens which may also provide, where desired, a high luminous efficiency and low visual brightness of the fixture; the former by the placing of a reflecting surface between the tops of the cones or prisms to reflect some of the incident rays back towards the light source and reflector where they will be reflected down again. This is an improvement over coating the prism surface areas since in that embodiment severe light loss will result from the repeated absorption by the coating because of the numerous inter-reflections between the prism surfaces that face each other.

Further objects and features of this invention will become clear from a study of the specification below and the drawings in which:

FIG. 1 is a diagram showing the path of a high-angle ray through a truncated cone lens;

FIG. 2 is a partial view of an embodiment of a refractor employing a plurality of truncated cone prisms;

FIG. 2a is a view similar to FIG. 2 showing a modification of the invention;

FIG. 3 is another embodiment of a refractor using truncated cone refractors; and FIG. 4 is a variation of the embodiment shown in FIG. 3.

The basic features of this invention are the provision of a truncated prism in place of the whole prism used generally in the prior art and the provision of a highly reflecting medium in conjunction with these prisms to reflect back into the fixture enclosure a substantial portion of the incident light.

A solid refracting cylinder has the property of transmitting a ray, which is incident to one of its faces at a vertical angle from its opposite parallel face at the same angle; although the emitted ray may have a different azimuthal orientation. When such a right cylinder is now distorted so that a symmetrical cone is formed, having flat surfaces at the top and bottom, an entering ray now will have its vertical angle decreased each time it is reflected from the sides of the cone by an amount proportional to the inclination of the sides to the vertical. Upon striking the emergent surface, therefore, the ray will be directed in a more downward direction than if it had passed through an ordinary right cylinder. Referring now to FIG. 1, an example is shown in which a ray 1 entering a surface A of a truncated cone 4 at an extreme angle of 90 degrees from the vertical, will be refracted to a value of about 42 degrees. (The index of refraction of the cylinder is assumed to be 1.5 for this example.) After reflection from the cone side 2 which has a declination of 3½ degrees, in this example, the angle of incidence to the flat emergent face at bottom B will be about 35 degrees, resulting in an emitted ray 3 of sixty degrees from the vertcial. Each reflection of the ray in this case produces a decrease of seven degrees in a vertical angle within the cone resulting in a shallower transmitted angle, thereby reducing the overall vertical angle of the transmitted light. The depth and diameter of the cone or prism may easily be calculated so that the rays with the largest incident angles of sixty to ninety degrees, incident at the dimensional extremities of the top face, experience at least one internal reflection, thus guaranteeing an emergent angle of not greater than sixty degrees. The angle of inclination of the cone or prism sides may have any practical value depending on the distribution angle desired for the emitted light. For instance a cone or prism angle of 7 degrees inclination will result in light emitted no higher than 45 degrees from vertical. Cones or prisms may also be formed on the refractor plate in an asymmetrical manner with respect to the plate surface when asymmetrical distributions are desired.

As shown in FIG. 2, a luminaire may be formed by placing a plurality of truncated cones 4 along a surface to form a light transmitter T. These cones may be integrally moulded parts of a refractive sheet of glass or plastic in which the cones form the uppermost surface nearest the source of light. The cones are spaced from each other as closely as mechanical considerations permit. The light is emitted onto the complex of cones from a light source 7 onto light incident surface A and is transmitted through transmitting surface C. The spaces between the cones and the cone surfaces themselves (except for the top surface A) are covered with a coating or shield 5 which is highly reflective such as silver, gold, aluminum, or a white material. This material may be opaque thereby allowing light to enter only through the top surfaces A. All other light is reflected back into the area above the light transmitter T. It is also possible to provide a partially transmitting surface between the cones to provide esthetic effects. Light scattering materials may be added to the refracting medium to soften the effect if it is found that the light distribution produced is too sharp. The coating material should not be in optical contact with the prism surface so that the internal reflection from the cone or prism surface is not hindered. Such a construction utilizing a formed shield of material is shown in FIG. 2a where indicating prime numerals and letters, similar to those in FIG. 2, indicate similar parts.

The slope of the cones, the cone depth and diameter may be calculated to render transmitted light from 180 degrees light distribution down to narrow beams.

A further improvement over the prior art, in which the truncated cones are employed, is shown in the embodiment in FIG. 3. If, as in the embodiment shown in FIG. 2, the areas between the cones are merely coated, a considerable amount of light loss will result from absorption by the coating because of numerous inter-reflections from cone surface to cone surface. If most of this inter-reflected light can be retransmitted into the fixture, there will be a resulting increase in luminous efficiency because there will be more opportunity for the light to be acted upon by the cones. The increase in the light reflected back into the fixture is accomplished by placing along the surface formed by the top surfaces A of the cones 4, a reflective medium 6 between the cones, facing the lamps 7 as shown in FIG. 3. This medium may be any one of many reflecting elements such as silver, aluminum, white material, etc. The reflecting material should not be in optical contact with the sides of the cone if the internal reflecting properties of the cones are to be maintained. The increase in reflected light back to the fixture causes the lamp to be less readily discernible at low viewing angles from the background as explained by the fact that surfaces of initially different brightness graduate to smaller contrast as the same light flux is added to each surface. The reflected light is then rereflected onto the cones 4 by the luminaire reflector 8, disposed above the lamps 7.

In FIG. 4, an embodiment similar to that shown in FIG. 3 is shown in which the reflective material 9 completely fills the spaces between the cones 4. The operation of this transmitter is substantially the same as that of the embodiment of FIG. 3.

What is claimed is:

1. A refractor extending in longitudinal and transverse planes for use in a luminaire having a linear light source, comprising: a light incident and a light emergent surface, a plurality of truncated prisms in longitudinal and transverse spaced relation with regard to each other on the light incident surface, said prisms having inwardly tapering sufaces extending toward the light source, and comprising means for reflecting light internally of said refractor toward said light emergent surface, said prisms having top surfaces at the truncated end, and light reflective material covering said tapering surfaces and the areas between said prisms, said light reflective material constituting means for reflecting light from the source toward the source, said top surfaces of said truncated prisms being exposed and constituting means for receiving and transmitting direct light from the linear light source at substantially all incident angles.

2. A refractor according to claim 1, wherein said reflective material completely fills the space between said prisms.

3. A refractor according to claim 1, wherein said reflective material is out of optical contact with said tapering surfaces of said truncated prisms.

4. The combination as recited in claim 1, wherein said prisms are conical in shape.

References Cited

UNITED STATES PATENTS

| | | | |
|---|---|---|---|
| 755,197 | 3/1904 | Wadsworth | 240—41.4 |
| 1,878,909 | 12/1923 | Stimson | 240—106.1 |
| 1,506,729 | 8/1924 | Stewart | 88—28.9 |
| 3,179,796 | 4/1965 | Rolph | 240—106 |
| 3,265,804 | 8/1966 | Berger et al. | 240—51.11 |

FOREIGN PATENTS

| | | |
|---|---|---|
| 205,689 | 10/1959 | Austria. |

NORTON ANSHER, *Primary Examiner.*

W. FRYE, *Assistant Examiner.*